United States Patent [19]
Veloz

[11] 3,731,090
[45] May 1, 1973

[54] FLUID STERILIZATION

[76] Inventor: Louis P. Veloz, 500 South Madison Avenue, Pasadena, Calif.

[22] Filed: Oct. 30, 1970

[21] Appl. No.: 85,648

[52] U.S. Cl. ............................250/43, 31/102, 119/5
[51] Int. Cl. ...............................................H01j 37/00
[58] Field of Search .........................250/43; 119/5; 21/102

[56]  References Cited

UNITED STATES PATENTS

| 3,447,892 | 6/1969 | Watson | 250/51 |
| 3,551,091 | 12/1970 | Veloz | 250/43 |
| 3,535,513 | 10/1970 | Cirami | 250/43 |

Primary Examiner—Archie R. Borchelt
Assistant Examiner—C. E. Church
Attorney—William P. Green

[57] ABSTRACT

A fluid sterilizer for an aquarium or the like, including an upper body section adapted to be suspended on an upper edge of the aquarium and carrying downwardly projecting ultraviolet lamps, and a lower body section detachably connectible to the upper section and through which water to be sterilized flows, with tubes of ultraviolet passing material being mounted in the lower section to define upwardly opening spaces into which the lamps project when the body structure is assembled.

18 Claims, 6 Drawing Figures

Patented May 1, 1973
3,731,090
2 Sheets-Sheet 1
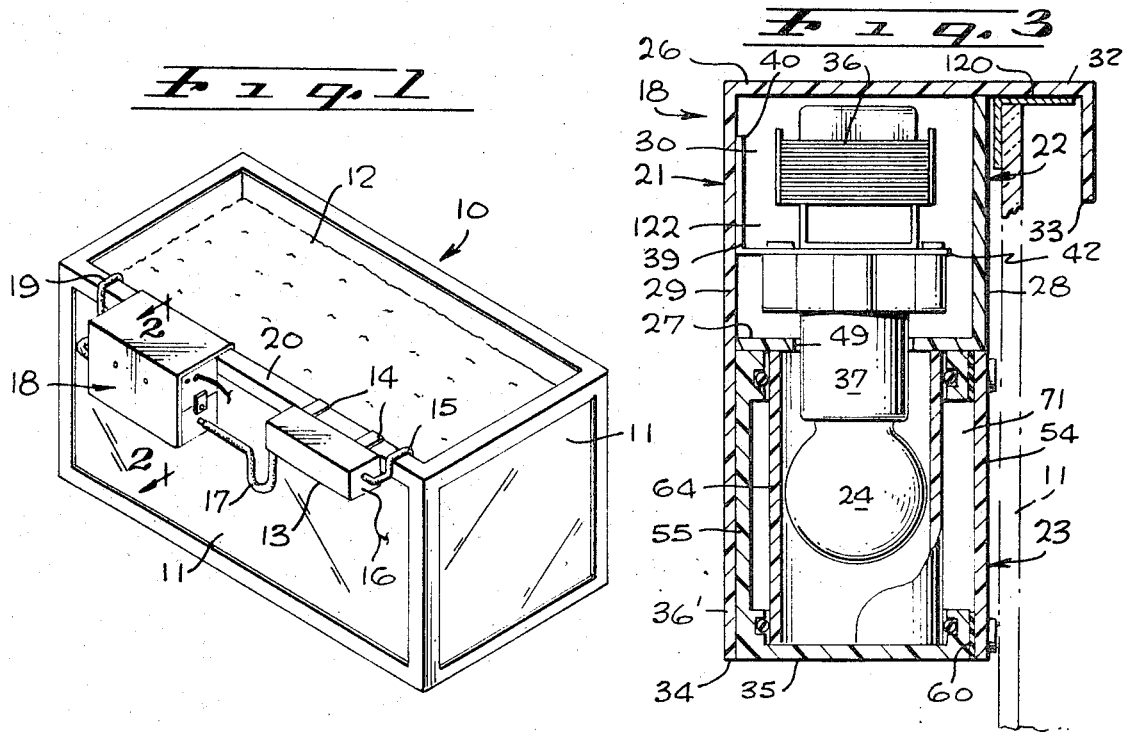
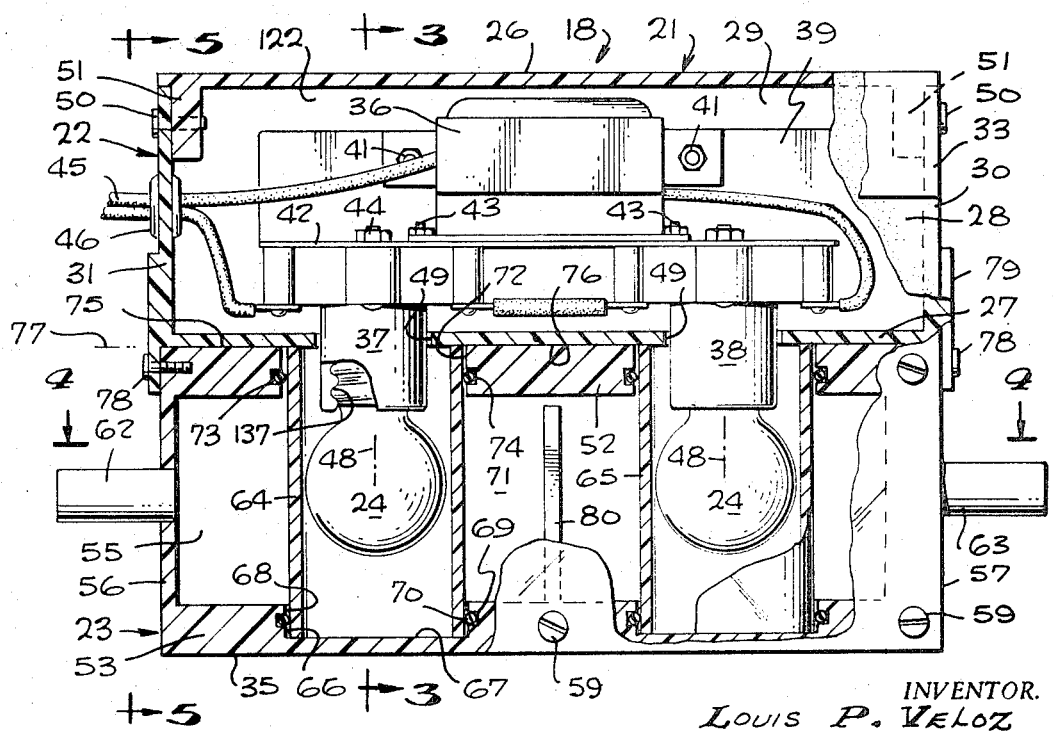
INVENTOR.
LOUIS P. VELOZ
BY William P. Green
ATTORNEY

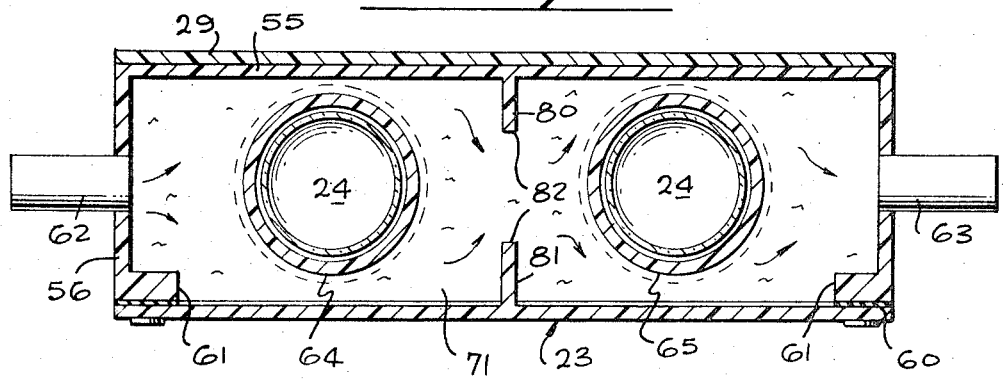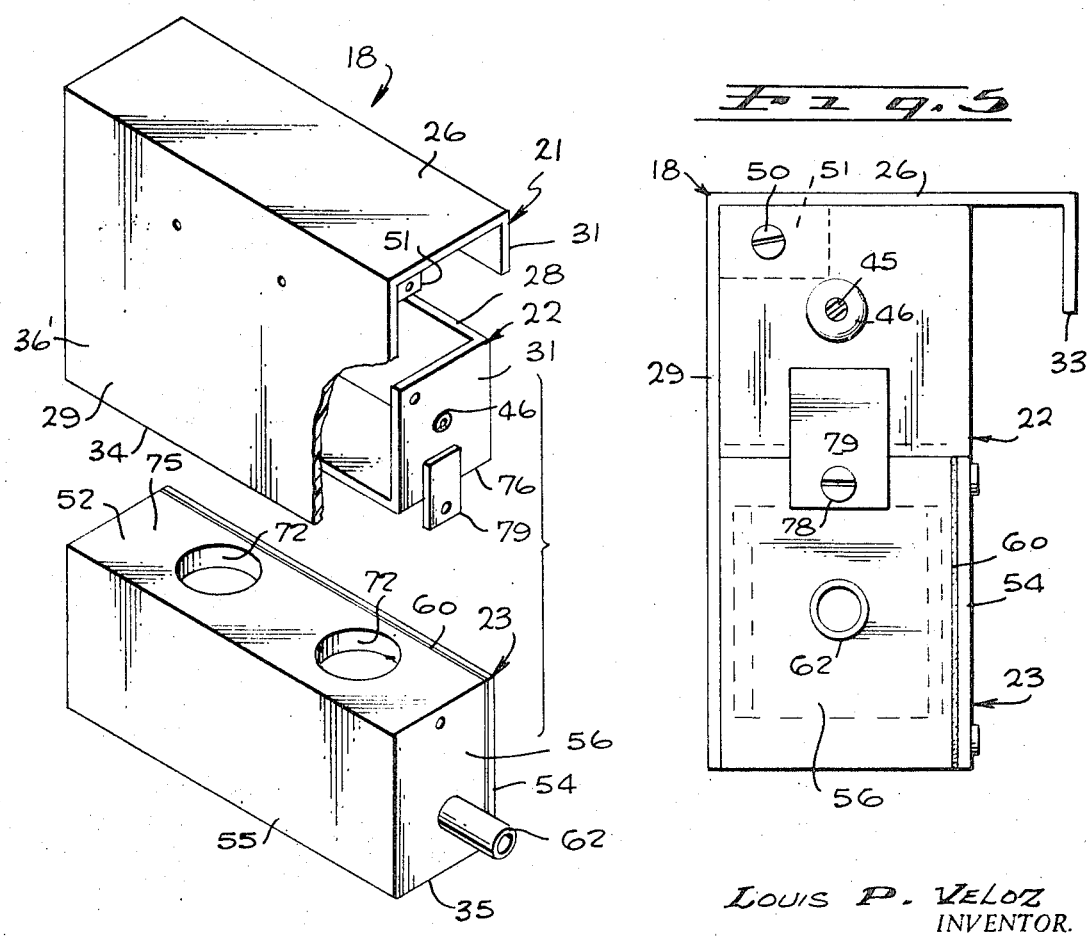

FLUID STERILIZATION

CROSS REFERENCE TO RELATED APPLICATION

Certain features of the present invention have been disclosed but not claimed in my previously filed copending application Ser. No. 51,065 filed June 30, 1970 on "Sterilization of a Fluid by Ultraviolet Radiation", of which the present application is a continuation-in-part.

BACKGROUND OF THE INVENTION

This invention relates to improved means for sterilizing a fluid by subjection to ultraviolet radiation. While it is contemplated broadly that some aspects of the invention may be applicable to devices for sterilizing other types of fluid, the invention is in many respects especially useful for sterilizing the water of an aquarium, and will be described as applied to that use.

Of the various ultraviolet type sterilizing units heretofore proposed by others for sterilizing aquarium water, I know of none which has in actual practice proven satisfactory enough for any wide scale use. Some of these devices have by virtue of their manner of construction been extremely dangerous to operate, because of the positional relationship between the electrically energized ultraviolet lamps and the water being sterilized. More particularly, some of these arrangements employ lamps which are directly immersed within and contacted by the water, and which therefore may cause dangerous electrical shocks through the water. Other proposals have isolated the lamps from the water more effectively, but in a manner resulting in very poor transmission of the ultraviolet radiation from the lamps to the water.

SUMMARY OF THE INVENTION

In a sterilizer constructed in accordance with the present invention, the lamp or lamps and the water conducting chamber are designed to interfit in a unique relation attaining optimum utilization of the ultraviolet energy while at the same time maintaining the lamps and their electrical connections isolated from any possible contact with the water in a manner assuring against any danger from electrical shock. At the same time, the structure is designed to enable ready access to the lamp or lamps for replacement, and to the lamps and the remainder of the equipment for cleaning to assure effective transmission of the radiation to the water. Further, in spite of these several advantages of the unit, it is structurally extremely simple and reliable in operation.

The sterilizing unit has a body structure which is formed of two sections, a first of which carries one or more ultraviolet lamps, while the second section contains a chamber through which the water to be sterilized is passed. When the two sections are connected together, the lamp or lamps project into the interior of the second section to a position in which radiation from the lamps may pass laterally through an ultraviolet transparent wall or walls into the water. Preferably, these walls take the form of tubes of quartz or the like appropriately sealed with respect to the remainder of the 'second body section' and into which the lamps project when the two sections of the body are assembled together. The lamp carrying section preferably is located above the water conducting section, with the lamps projecting downwardly, and with the tubes preferably disposed vertically in the lower section. About each tube, there may be provided two seal rings for isolating the water from the lamps. The upper section may have a hook portion projecting to a location for reception about the upper edge of an aquarium, to suspend the entire unit adjacent a wall of the aquarium.

BRIEF DESCRIPTION OF THE DRAWING

The above and other features and objects of the invention will be better understood from the following detailed description of the typical embodiment illustrated in the accompanying drawings in which:

FIG. 1 is a perspective view of an aquarium provided with a sterilizer embodying the invention;

FIG. 2 is an enlarged vertical section taken on line 2—2 of FIG. 1;

FIG. 3 is a transverse vertical section taken on line 3—3 of FIG. 2;

FIG. 4 is a horizontal section taken on line 4—4 of FIG. 2;

FIG. 5 is an end view taken on line 5—5 of FIG. 2; and

FIG. 6 is an exploded perspective representation of the sterilizer, and showing especially the construction of its various housing parts.

DESCRIPTION OF THE PREFERRED EMBODIMENT

Referring first to FIG. 1, I have shown at 10 a conventional rectangular home aquarium, having four vertical glass or plastic sidewalls 11 and a bottom wall, and containing a body of water 12 within which fish and/or other sea life are contained. The usual water circulating pump 13 is mounted on a back of the aquarium, as by hangers or hooks 14 extending over the top edge of the back wall. This pump takes suction from the water in the aquarium through a hose 15, and is energized by electrical power from a supply line 16 to pump water slowly through an outlet hose 17 to a sterilizing unit 18 embodying the present invention. This unit 18 ultimately discharges the water through a hose 19 which extends over the upper edge 20 of the rear wall 11 and then downwardly into the aquarium. Pump 13 may contain a built-in filter unit which removes particulate matter from the water before delivery to the sterilizing unit 18.

Sterilizer unit 18 has a housing 21 including an upper housing section 22 and a lower housing section 23. Upper section 22 carries two downwardly projecting ultraviolet lamps 24 which sterilize water pumped through the bottom housing section 23.

The upper section 22 of the housing may form a rectangular enclosure or chamber 122, defined by two parallel horizontal top and bottom walls 26 and 27, two parallel vertical inner and outer walls 28 and 29, and two parallel vertical opposite end walls 30 and 31 disposed perpendicular to walls 28 and 29. Top wall 26 may be rectangular, and projects inwardly beyond the plane of vertical inner wall 28, to form a horizontal projection 32 which extends over the upper edge or rear wall 11 of the aquarium, which edge may include and be defined by a top horizontal frame element 20 of angle iron cross-section. The inwardly projecting portion 32 of top wall 26 carries a downwardly projecting lip 33 for engaging the inner extremity of element 120, or for engaging the inner surface of rear wall 11 if no frame element 120 is provided at the top of that wall, so that portions 32 and 33 form in effect a hook portion of the housing which is receivable over the upper edge of the rear wall in a manner supporting the entire sterilizer 18 in the position illustrated in FIG. 1. The outer wall 29 of upper section 22 of the housing is rectangular and projects downwardly beneath the level of bottom wall 27 of the upper housing section, and to a lower edge 34 of wall 29 lying in essentially the same horizontal plane as the undersurface 35 of bottom section 23 of the housing. All of the various mentioned walls 26, 27, 28, 29, 30, and 31 of upper housing section 22 are desirably opaque to both visible and ultraviolet radiation, to enclose and shield from view within compartment 122 the electrical ballast 36 and the upper portions of the sockets 37 and 38 into which ultraviolet lamps 24 are threadedly connectible.

The ballast 36 and sockets are for best results secured to outer vertical side wall 29 of the upper section 22 of housing 21. For this purpose, there may be provided a mounting bracket 39 having a vertical portion 40 secured to vertical housing wall 29 by fasteners 41, typically screws or rivets. Bracket 39 also has an inwardly projecting horizontal portion 42, to the upper side of which ballast 36 is mounted by fasteners 43, and to the under side of which brackets 37 and 38 are rigidly secured as by screws 44. An electrical power line 45 is connectible to house current (preferably 110 volt, 60 cycle alternating current), and extends into the interior of the upper section of the housing through a rubber grommet 46 connected into an opening in wall 31, with the power line being connected within compartment 122 to the ballast and sockets in the conventional series relationship.

These sockets 37 and 38 have downwardly projecting tubular externally substantially cylindrical portions 47 which are centered about parallel vertical axes 48, and project downwardly through circular openings 49 in bottom wall 27 of the upper section of the housing. These sockets contain internal threads 137 centered about the axes 48 and into which the upper threaded ends of the bulbs 24 are connectible.

In order to allow access to the interior of the upper hollow section of housing 21, for repair or replacement of the electrical parts, it is desirable that the upper housing section be formed in two parts appropriately secured together and adapted to be separated when desired. For this purpose, the previously discussed upper wall 26 and outer wall 29, as well as the downwardly projecting lip 33 on wall 26, may all be formed together as a first part of the upper housing section, while the remaining walls 27, 28, 30, and 31 may be formed as a second housing part, with this second part being securable removably to the first part by screws 50 extending through apertures in wall 30 and 31 and connecting into lugs or shoulders 51 projecting downwardly from top wall 26. If these two screws 50 are detached and bolts 24 are removed from their sockets, the 'second part' of the upper section of the housing may be removed downwardly from the upper part consisting of walls 26 and 29 (see FIG. 6), to allow access to the sockets and ballast for repair, replacement, cleaning, or the like. The wires connecting line 45 to the sockets and ballast may be sufficiently long or loose to enable such movement of grommet 46 and the wall by which it is carried relative to the sockets and ballast.

The lower section 28 of housing 21 is of the essentially rectangular configuration illustrated in FIG. 6, having a horizontal rectangular bottom wall 53, two parallel vertical rectangular inner or outer walls 54 and 55, and two parallel vertical opposite end walls 56 and 57. Outer wall 55 is received adjacent and parallel to the downwardly projecting portion 36' of outer wall 29 of upper section 22. Inner wall 54 of lower section 23 may be aligned vertically with the inner wall 28 of the upper section of the housing, and is preferably rectangular and formed separately from the rest of the walls of the bottom section 23. The other walls 52, 53, 55, 56 and 57 of lower section 23 may all be formed integrally as a single one piece unit, typically by injection molding this main portion of the lower housing section form an appropriate essentially rigid resinous plastic material. This material, like that forming the two parts of the upper housing section (which may also be injection molded of a suitable rigid resinous plastic material), is desirably opaque to both ultraviolet radiation and visible light, to prevent escape of any possibly harmful radiation from the housing. The inner separately formed vertical wall 54, which is received adjacent and parallel to the rear wall 11 of the aquarium, may be formed of a substance which is opaque to ultraviolet radiation of the bacteria destroying wave lengths (and desirably all ultraviolet) but is transparent to visible light, so that the small amounts of visible light produced by lamps 24 may pass through wall 54 into the interior of the aquarium to illuminate it dimly in an eye pleasing manner. A suitable transparent acrylic resinous plastic material may be used for this purpose, such as methylmethacrylate. Wall 54 may be secured detachably to the remainder of the lower housing section in any convenient manner, as by a number of screws 59 connecting into the relatively thick top and bottom walls 52 and 53 of the main portion of lower section 23. Typically, three such screws may be connected into the upper wall 52, at its opposite ends and at a central location, and three similar screws may be connected into the lower wall 53 at corresponding locations. A rectangular sealing gasket 60 may be received between wall 54 and the engaged edges of walls 52, 53, 56 and 57, entirely about the periphery of wall 54, to form a fluid tight seal between these detachably interconnected parts. As seen best in FIG. 4, this seal may be enhanced by providing the two end walls 56 and 57 with flanges 61 forming widened areas against which the gasket 60 may abut. The two end walls 56 and 57 may also carry two axially aligned oppositely directed horizontal inlet and outlet tubes 62 and 63, which may be molded integrally with the end walls 56 and 57 or be connected thereto, and to which the previously mentioned inlet and outlet hoses 17 and 19 are connected. The water to be sterilized thus flows through the interior of lower housing section 23 between inlet 62 and outlet 63, and in a left to right direction as viewed in FIGS. 2 and 4.

To protect ultraviolet lamps 24 and their sockets against contact with the water being sterilized, lower housing section 23 carries two parallel vertical tubes 64 and 65 which are disposed about the two lamps 24 respectively, and are centered cylindrically about the two spaced vertical axes 48. The lower end of each of these tubes is cut off in a horizontal plane, and fits within a short cylindrical vertical recess 66 formed in bottom wall 53. Each of these recesses 66 has a lower horizontal bottom wall 67 and a cylindrical vertical side wall 68 centered about the corresponding vertical axis 48. An annular groove 69 formed in the side wall 68 contains a preferably rubber annular O-ring 70, dimensioned to annularly engage the outer surface of the corresponding tube 64 in a manner forming an annular fluid tight seal between the lower portion of tube 64 and bottom wall 53, to thus prevent the flow of any water from the inner compartment 71 in lower housing section 23 past the lower edge of the corresponding tube 64 and into the interior of that tube.

The upper end of each of the two tubes 64 is received within a vertical cylindrical bore or opening 72 formed in top wall 52 of the lower section of the housing, and centered about the corresponding one of the two axes 48. An annular groove 73 is formed in the side wall of bore 72, and contains a rubber O-ring or the like 74 for forming an annular fluid tight seal between the upper portion of tube 64 and top wall 52, in a manner preventing escape of any of the water upwardly past the outside of the tube. The engagement of O-rings 70 and 74 with the outer surface of tube 64 is sufficiently tight to frictionally retain tubes 64 in their FIG. 2 illustrated positions with respect to lower section 23 of the housing, even when this section of the housing is removed downwardly from the upper section of the housing as seen in FIG. 6. This frictional engagement is, however, sufficiently light to enable forced upward withdrawal of tubes 64 from lower housing section 23 if and when it becomes necessary at any time to remove these tubes for repair, replacement, or cleaning. Tubes 64 may have an internal diameter just slightly greater than the maximum outer diameter of lamps 24, to be received to closely proximate relation to those lamps.

Tubes 64 are formed of a material which is transparent to ultraviolet radiation, or at least to the wave lengths of such radiation which are capable of destroying bacteria (2000 to 3000 angstroms). The preferred materials for this purpose are quartz tubing or tubing formed of a fluorocarbon polymer, such as tetrafluoroethylene (as sold by E. I. DuPont du Nemours under the Trademark "Teflon"), both of which materials are transparent to all ultraviolet radiation.

As seen clearly in FIGS. 2 and 3, the upper rectangular surface 75 of top wall 52 of the lower body section 23 desirably abuts upwardly against the correspondingly rectangular undersurface 76 of bottom wall 27 of the upper body section 22 in the FIGS. 2 and 3 assembled condition of the apparatus. These two surfaces 75 and 76 are desirably both horizontal, lying in the plane 77 of FIG. 2. The upper ends of the quartz tubes 64 and 65 may be cut off transversely in the same horizontal plane. The lower body section 23 is detachably secured to the upper body section in this assembled position in appropriate manner, preferably by means of two screws or other fasteners 78, which extend through openings formed in downwardly projecting lugs or tabs 79 carried by end walls 30 and 31 of the upper body section. These screws connect threadedly into opposite ends of the thick upper wall 52 of the lower housing section. The lugs may be so formed as to be received against the outer vertical surfaces of end walls 56 and 57 of the lower section.

To discuss briefly the manner of use of the sterilizing device of the present invention, assume that both the pump 13 and sterilizer 18 of FIG. 1 are appropriately energized by a suitable electrical power source. When thus energized, pump 13 acts to draw water from the aquarium through hose 15, and discharge that water under pressure through hose 17 into the interior of lower housing section 23 of unit 18. This water flows horizontally through chamber 71 in that lower housing section, and past both sides of each of the two quartz tubes 64 and 65, and their contained lamps 24. Since the tubes are entirely surrounded by water, ultraviolet radiation from the lamps may pass into the water through an angle of 360° about the lamps, with the result that a very large percentage of the radiation from the lamps is utilized for germicidal purposes, and very reliable and effective destruction of all of the bacteria in the water is attained with minimum wattage requirements for the lamps. To assure proper subjection of all of the water to the radiation, means may be provided in the sterilizing chamber 71 for deflecting the water along a somewhat circuitous path, as by providing the outer wall 55 of the lower housing section and the removable inner wall 54 of that housing section with inwardly projecting vertically extending typically flat planar and opposed deflector plates 80 and 81 (see FIGS. 2 and 4). These plates may be received essentially between the two lamps 24, and project inwardly far enough to define a restricted gap 82 between the lamps through which the water must pass in flowing from one lamp to the other, so that some turbulance is set up, and none of the water can follow a straight line path through chamber 71. Repeated circulation of the water through the sterilizer assures continuous maintenance of the water in the aquarium in a condition of very low bacteria count.

If and when it becomes necessary to clean the sterilizing apparatus or replace lamps 24, lower housing section 23 may be easily detached from upper housing section 22 by simply removing the two screws 78 at opposite ends of the housing, and then lowering section 23 in the manner illustrated in FIG. 6. This allows ready access to the lamps for cleaning or replacement, and exposes the lower housing section for cleaning. If desired, the quartz tubes 64 and 65 may be pulled upwardly from within the lower housing section, to allow a thorough cleaning of both the inside and outside of these tubes, in order to assure effective transmission of ultraviolet energy through the tubes and into the water. If the ballast 36 or lamp sockets 37 and 38 require repair, the two parts of the upper housing section 22 may be separated by removing the two screws 50, to allow detachment of these parts as also illustrated in FIG. 6.

While a certain specific embodiment of the present invention has been disclosed as typical the invention is of course not limited to this particular form, but rather is applicable broadly to all such variations as fall within the scope of the appended claims.

I claim:

1. An aquarium sterilizer comprising a body structure including a first body section, and a second body section located below a portion of the first section and separable therefrom and containing a sterilizing chamber; means on one of said sections for securing it to an aquarium; inlet and outlet means for passing aquarium water through said chamber in the second section for sterilization therein; at least one downwardly facing lamp socket carried by said first section and containing a downwardly facing lamp mounting socket recess; at least one ultraviolet lamp having an upper mounting portion projecting upwardly into said socket recess and carried and energized thereby and having an ultraviolet radiation emitting lower portion projecting downwardly from said first body section to a location within said second section and into an upwardly opening space about which water in said sterilizing chamber is received so that said lamp can emit radiation laterally into said water when the two sections are together; and means securing said sections detachably together with said lamp projecting downwardly into the second section but permitting separation of the sections to a condition in which said lamp is withdrawn upwardly with said first body section and upwardly from within said second body section for cleaning or replacement; there being an ultraviolet-passing wall carried by said second body section through which ultraviolet radiation passes generally horizontally from said lamp to said water and which isolates said lamp from contact with the water, said sterilizing chamber in said second body section being sealed against flow of water into or out of the sterilizing chamber except through said inlet and outlet means, and being constructed to remain so sealed when said first body section and said socket and said lamp have been withdrawn upwardly relative to said second body section to a position removing said lamp from within said second section and said upwardly opening space.

2. A sterilizer as recited in claim 1, in which said means for securing one body section to an aquarium include a hook structure projecting laterally from said first body section and adapted to be hooked over an upper edge of an aquarium to suspend said sterilizer therefrom.

3. A sterilizer as recited in claim 1, in which said first body section is hollow and has a bottom wall containing an opening through which said lamp socket projects downwardly beyond said wall to carry said lamp.

4. A sterilizer as recited in claim 1, in which said first body section is hollow and has a bottom wall containing an opening through which said lamp socket projects downwardly beyond said wall to carry said lamp, there being a ballast for said lamp contained in said hollow first body section.

5. A sterilizer as recited in claim 1, in which said first body section has a wall extending downwardly along an outer side of the second body section at a location horizontally opposite said chamber.

6. A sterilizer as recited in claim 1, in which said first body section includes a first part having a top wall extending generally horizontally across the upper side of the body structure and having a lip turned downwardly to be hooked over an upper edge of the aquarium and forming said means for securing one section to the aquarium; said first part having a downturned generally vertical outer wall, said first body section including also a second part having generally vertical and generally horizontal walls disposed essentially parallel to but spaced from the two walls of said first part in a relation defining an essentially rectangular lamp mounting chamber, said lamp socket being mounted within said rectangular chamber and projecting downwardly through an opening in said generally horizontal wall of said second part of the first body section, a lamp ballast contained within said rectangular chamber, and means detachably securing said two parts of the first body section together.

7. A sterilizer as recited in claim 6, in which said second part of said first body section has two spaced vertical end walls, said first part of the first body section having tabs projecting downwardly at the inner sides of said end walls, and said means for connecting the two parts of said first body section together being fasteners extending through said end walls and into said tabs.

8. A sterilizer as recited in claim 1, in which said first body section is generally rectangular and hollow and received above the second body section, said first body section having a top wall with a portion projecting therefrom and forming a hook adapted to be received over an upper edge of the aquarium to suspend the body structure therefrom, and serving as said means for securing one section to the aquarium, a lamp ballast contained within said hollow upper body section, there being a plurality of said lamps having individual downwardly opening sockets mounted within said hollow upper body section and projecting downwardly through openings in a bottom wall thereof to carry the lamps at a location beneath said bottom wall, said second body section being essentially rectangular and generally coextensive horizontally with the upper body section and having vertically spaced top and bottom walls with said walls extending therebetween to define said sterilizing chamber, said inlet and outlet means for passing water through the chamber including an inlet at one end of the sterilizing chamber and an outlet at the opposite end.

9. A sterilizer as recited in claim 1, in which said means securing said body sections together include resilient detent tabs on one of said sections releasably engageable with the other section in retaining relation.

10. A sterilizer as recited in claim 1, in which said second body section has an inner wall to be received adjacent a side wall of the aquarium and formed of a material which will not pass ultraviolet radiation but will pass some visible light from said lamp through the wall of the aquarium and into the interior thereof.

11. An aquarium sterilizer comprising a body structure including a first body section, and a second body section located below a portion of the first section and separable therefrom and containing a sterilizing chamber; means on one of said sections for securing it to an aquarium; inlet and outlet means for passing aquarium water through said chamber in the second section for sterilization therein; at least one downwardly facing lamp socket carried by said first section and containing a downwardly facing lamp mounting socket recess; at least one ultraviolet lamp having an upper mounting portion projecting upwardly into said socket recess and carried and energized thereby and having an ultraviolet radiation emitting lower portion projecting downwardly from said first body section to a location within said second section and into an upwardly opening lamp receiving compartment about which water in said sterilizing chamber is received so that said lamp can emit radiation laterally into said water when the two sections are together; and means securing said sections detachably together with said lamp projecting downwardly in the second second section but permitting separation of the sections to a condition in which said lamp is withdrawn upwardly with said first body section and upwardly from within said second body section for cleaning or replacement; said second body section having a generally tubular ultraviolet-passing wall encircling said lamp and extending generally vertically within the interior of said sterilizing chamber and defining said upwardly opening lamp receiving compartment and peripherally sealed to prevent flow of water from said sterilizing chamber to the interior of said compartment, said radiation emitting lower portion of the lamp being received within said compartment when the two body sections are secured together to pass ultraviolet radiation laterally from the lamp through said wall and into water in said chamber, said sterilizing chamber in said second body section being sealed against flow of water into or out of the sterilizing chamber except through said inlet and outlet means, and being constructed to remain so sealed when said first body section and said socket and said lamp have been withdrawn upwardly relative to said second body section to a position removing said lamp from within said second section and said upwardly opening lamp receiving compartment.

12. A sterilizer as recited in claim 11, in which said means for securing one body section to an aquarium include a hook structure projecting laterally from said first body section and adapted to be hooked over an upper edge of an aquarium to suspend said sterilizer therefrom.

13. A sterilizer as recited in claim 11, in which said first body section is hollow and has a bottom wall containing an opening through which said lamp socket projects downwardly beyond said wall to carry said lamp, there being a ballast for said lamp contained in said hollow first body section.

14. A sterilizer as recited in claim 11, in which said tubular wall is open at both ends but is sealed peripherally at two vertically spaced locations to said second body section, with the water in said sterilizing chamber contacting said tubular wall only between said spaced locations.

15. A sterilizer as recited in claim 11, in which said tubular wall is open at both ends but is sealed peripherally at two vertically spaced locations to said second body section, with the water in said sterilizing chamber contacting said tubular wall only between said spaced locations, there being two seal rings disposed about said tubular wall at said vertically spaced locations and engaging said second body section annularly to form the seals at said locations.

16. A sterilizer as recited in claim 11, in which said first body section is generally rectangular and hollow and received above the second body section, said first body section having a top wall with a portion projecting therefrom and forming a hook adapted to be received over an upper edge of the aquarium to suspend the body structure therefrom and comprising said means for securing one section to the aquarium, a lamp ballast contained within said hollow upper body section, there being a plurality of said lamps having individual downwardly opening sockets mounted within said hollow upper body section and projecting downwardly through openings in a bottom wall thereof to carry the lamps at a location beneath said bottom wall, said second body section being essentially rectangular and generally coextensive horizontally with the first body section and having vertically spaced top and bottom walls with side walls extending therebetween to define said sterilizing chamber, there being a plurality of said vertically extending generally tubular walls formed of material adapted to pass ultraviolet radiation and mounted within said lower body section to define a plurality of said compartments which open upwardly and into which said lamps project downwardly when the two body sections are secured together, and two vertically spaced seal rings disposed about each of said tubular walls and received within essentially annular internal grooves formed within bores in said top and bottom walls of said second body section to form annular seals confining the water in said sterilizing chamber vertically between said rings.

17. A sterilizer as recited in claim 16, in which said second body section has an inner wall to be received adjacent a side wall of the aquarium and formed of a material which will not pass ultraviolet radiation but will pass some visible light from said lamp through the wall of the aquarium and into the interior thereof.

18. A sterilizer as recited in claim 16, in which said first body section has a wall extending downwardly along an outer side of the second body section at a location horizontally opposite said chamber.

* * * * *